United States Patent [19]

Salts

[11] Patent Number: 4,712,975
[45] Date of Patent: Dec. 15, 1987

[54] BAG PALLETIZING SYSTEM
[75] Inventor: Thomas R. Salts, Alpena, Mich.
[73] Assignee: Besser Company, Alpena, Mich.
[21] Appl. No.: 775,731
[22] Filed: Sep. 13, 1985
[51] Int. Cl.[4] .................. B65G 57/30; B65G 57/22
[52] U.S. Cl. ................................ 414/786; 100/264; 414/36; 414/96
[58] Field of Search ............ 414/36, 57, 77, 96, 414/101, 786, 903; 100/264

[56] References Cited

U.S. PATENT DOCUMENTS

| | | | |
|---|---|---|---|
| 2,949,118 | 8/1960 | Long | 414/96 X |
| 3,137,286 | 6/1964 | Raynor | 414/36 X |
| 3,411,773 | 11/1968 | Cornwall | 271/73 |
| 3,468,436 | 9/1969 | Nanney et al. | 414/101 X |
| 3,618,791 | 11/1971 | Potter et al. | 414/96 X |
| 4,024,965 | 5/1977 | Marth et al. | 414/36 |
| 4,181,460 | 1/1980 | Lutz | 100/264 X |
| 4,234,280 | 11/1980 | Donnelly et al. | 414/96 X |
| 4,366,751 | 1/1983 | Spaller, Jr. | 414/77 X |
| 4,453,874 | 6/1984 | Veldhuizen et al. | 414/117 X |

FOREIGN PATENT DOCUMENTS

| | | | |
|---|---|---|---|
| 672634 | 11/1965 | Belgium | 198/431 |
| 52-13274 | 2/1977 | Japan | 414/903 |
| 2025354 | 1/1980 | United Kingdom | 414/77 |

*Primary Examiner*—Leslie J. Paperner
*Assistant Examiner*—Janice Krizek
*Attorney, Agent, or Firm*—Learman & McCulloch

[57] ABSTRACT

Apparatus for assembling products such as bagged particulate material, into a multi-tiered stack upon a pallet, is designed to substantially eliminate relative movement between the articles and article supporting surfaces of the apparatus during the stacking operation. The articles are arranged into a tier upon an air table, then transferred to an elevator consisting of spaced parallel rollers. The elevator is then raised to a location above a set of retractable tines which are then projected beneath the elevator into the spaces between the rollers to receive the tier of articles as the elevator is lowered. The elevator then brings a second tier of articles to a location just below the extended tines which are then retracted to drop the tier supported on the tines onto the tier supported on the elevator, which is then raised above the tines. The tines are then reinserted beneath the elevator to receive the two stacked tiers and this cycle is repeated until the stack is complete. The tines each have a flexible belt trained across their upper surfaces so that the belt is between the tine and the article. Upon retracting of the tine from beneath the articles the belt slips with respect to the tine so there is no relative motion between the belt and engaged surface of the article as the tine is retracted.

2 Claims, 14 Drawing Figures

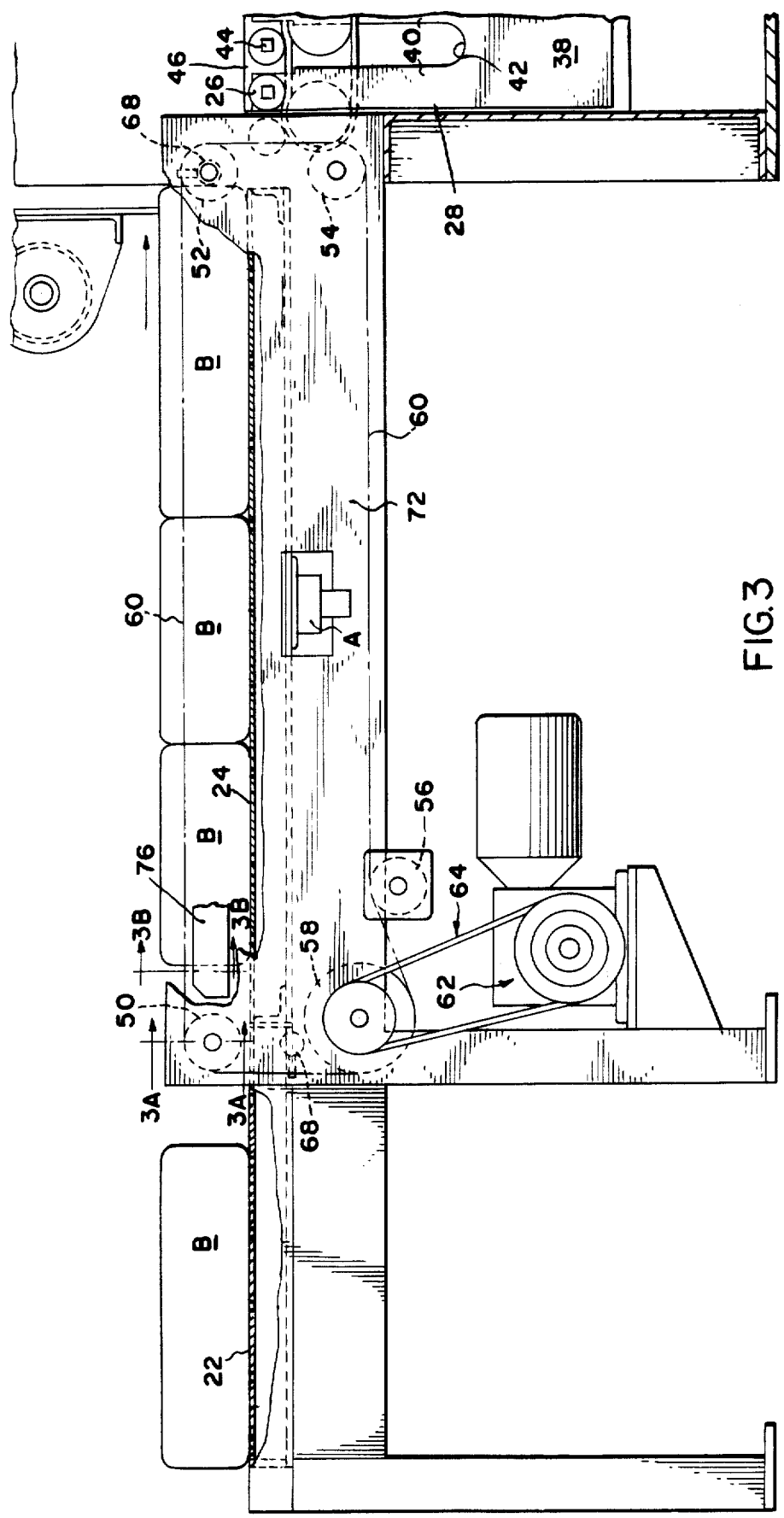
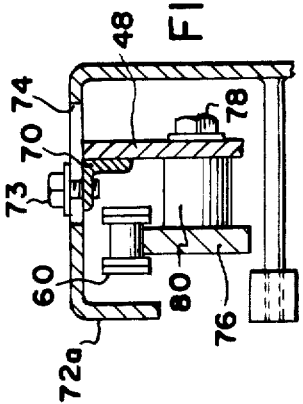
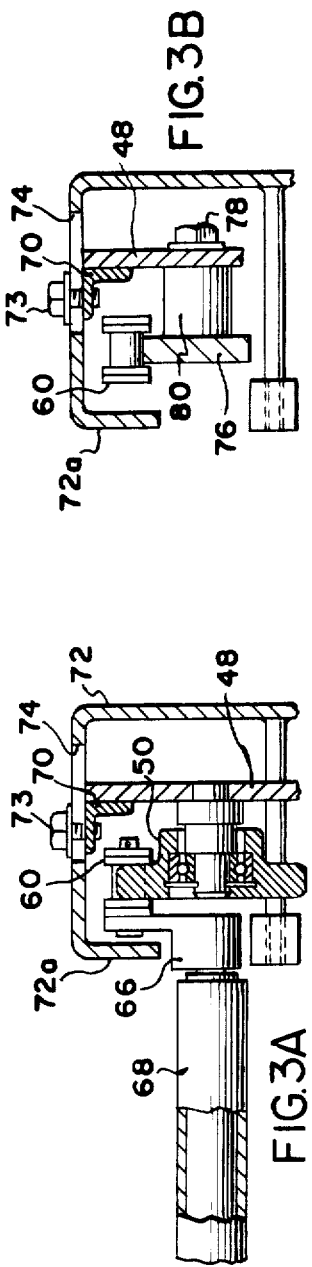

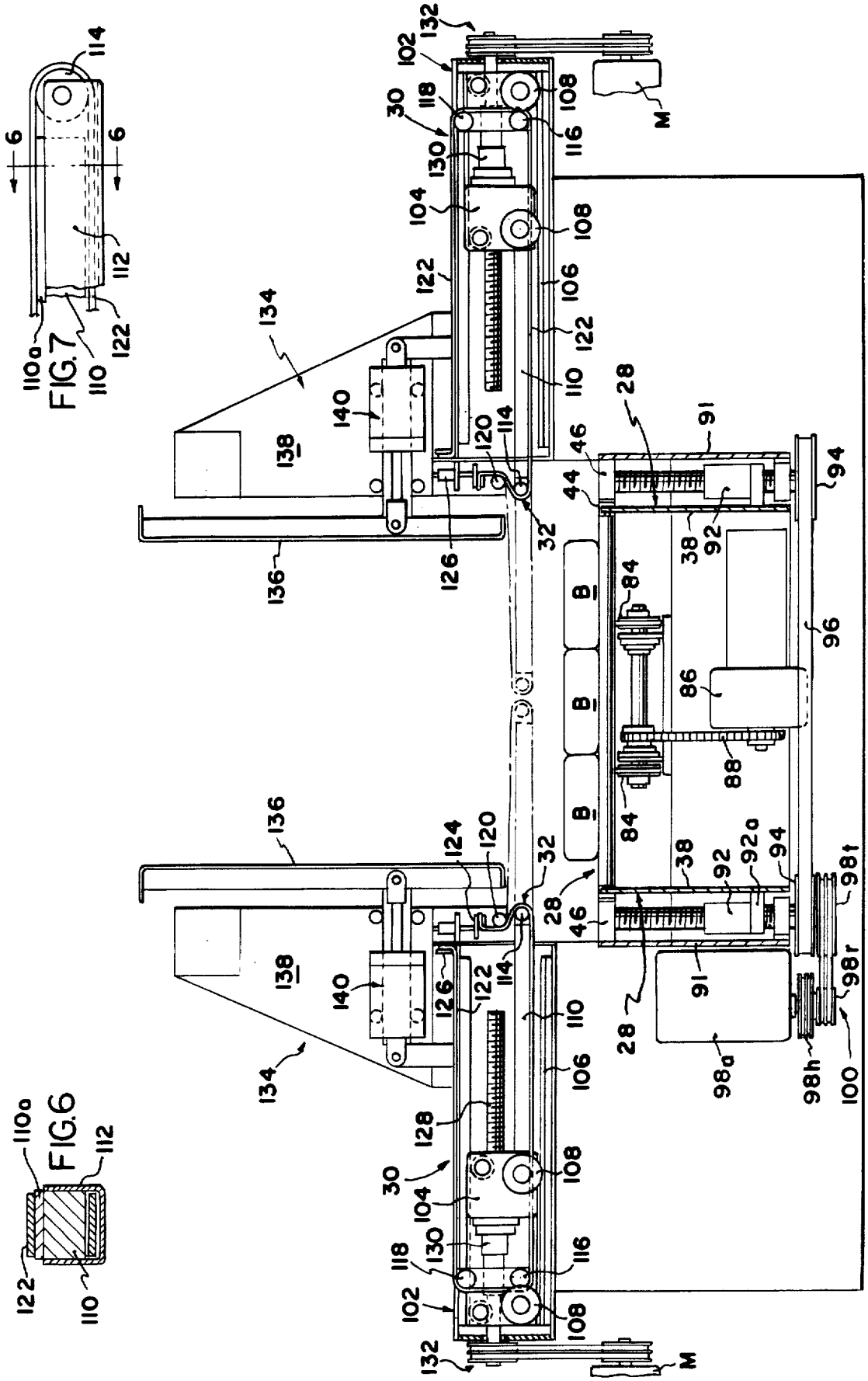

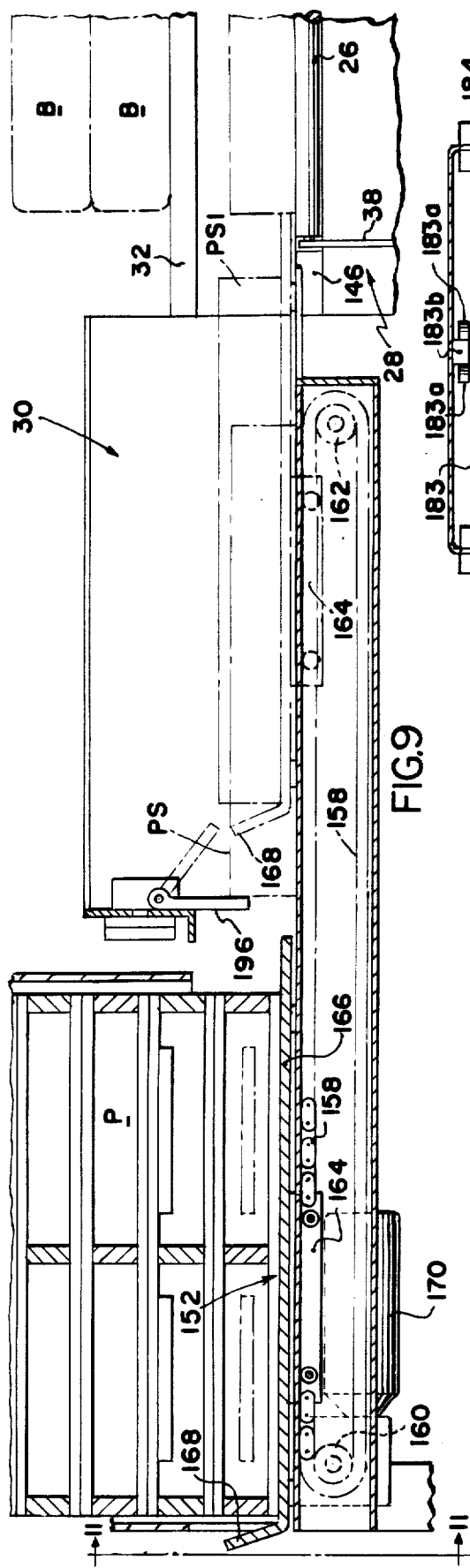
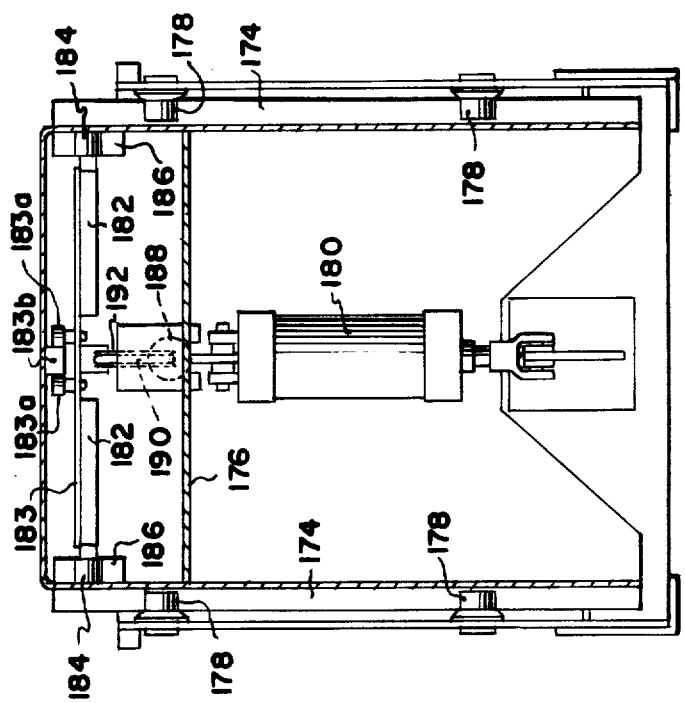
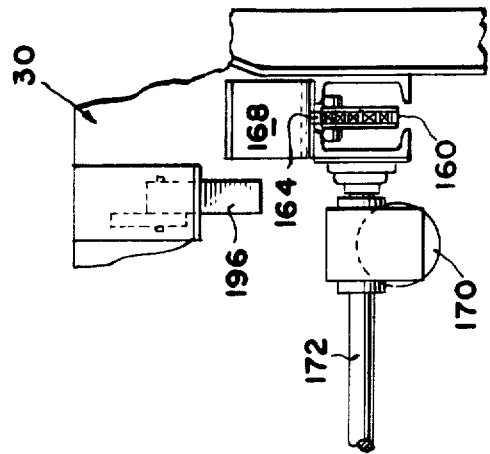
FIG.9
FIG.10
FIG.11

BAG PALLETIZING SYSTEM

BACKGROUND OF THE INVENTION

The present invention is directed to apparatus and methods for forming a multi-tier stack of like bags of granular material, such as cement, upon a pallet. As compared to the stacking or palletizing of relatively rigid articles, such as concrete block or cartons of canned goods, the machine palletizing of bagged goods presents additional problems in that the individual bags are not rigid and friction between the bag and machine surfaces which move relative to the bag can cause bags to bunch and the bag shape to become distorted and rip to spill the material in the bag. Ripping of the bag during handling with available machinery is quite common where, as in the case of cement, the bag is formed of paper. Care must be taken to handle the bag rather gently in that high impact forces can rupture the bag.

The present invention is directed to a bag palletizing machine in which frictional forces between the bag and machine surfaces which must move relative to the bag, and impact forces, are minimized.

SUMMARY OF THE INVENTION

In accordance with the present invention, like bags of material which are to be assembled into a multi-tier stack on a pallet are fed individually onto an air table upon which the bags may be freely and without any friction manually arranged upon the air cushions generated by the table into a compact rectangular group. This arranged group of bags forms a tier which is then transferred from the air table onto an elevator platform whose floor is defined by a series of spaced parallel rollers. Horizontal tines are mounted at opposite sides of the elevator shaft for movement between an extended position in which the tines project into the shaft. The tines include a plurality of spaced individual tines which are parallel to each other and parallel to the rollers of the elevator platform. The spacing between individual tines is such that the rollers of the elevator platform can pass freely upwardly or downwardly through the spaces between adjacent tines. The tines may selectively be located either in the extended position in which they project into the elevator shaft or a retracted position in which the tines are withdrawn clear from the elevator shaft.

When the tines are withdrawn, the elevator platform is raised to carry the tier of articles supported upon the platform to an elevated position slightly above the article-supporting surfaces of the tines, which are then returned to their extended position. Upon subsequent lowering of the elevator platform, support of the articles is transferred from the elevator platform to the tines.

After the elevator has been returned to its lower position, a second tier of articles is fed from the air table onto the elevator platform, which is then raised again to an intermediate elevated position immediately below the extended tines. Upon withdrawal of the tines, the layer previously supported by the tines drops onto the second tier of articles supported upon the elevator platform. The platform is then raised to its elevated position and the tines are reinserted beneath the lowermost of the two tiers of articles supported upon the platform. Upon subsequent lowering of the elevator platform, support of the two stacked tiers of articles is transferred to the tines.

The foregoing cycles are repeated until a stack consisting of the desired number of tiers of articles has been assembled upon the extended tines.

The tines include an elongate horizontal frame member which can be reciprocated into and out of the elevator shaft. A roller is carried at the shaft end of the horizontal member and a second roller is mounted at its opposite end. A flexible belt is trained about both rollers and fixed at its opposite ends to stationary locations on the machine frame. As the tine is extended, the belt is laid down on the upper surface of the extending tine, and as the tine is retracted, the upwardly facing surface of the belt remains stationary, but its forward end passes around the roller on the shaft end as the tine retracts. Thus, the upper surface of the tine as presented by the belt remains effectively stationary with respect to articles supported upon it so that there is essentially no friction exerted between the retracting tine and articles from which the tine is being withdrawn beneath.

When the desired number of tiers of articles have been formed upon the stack, upon lowering of the elevator platform to its lowered position, a pallet is fed from a pallet magazine onto the elevator platform and elevated to a position immediately below the tines. Upon retraction of the tines, the formed stack is deposited upon the pallet which is subsequently lowered by the elevator platform to the lowered position and discharged from the elevator at the side opposite that which newly formed tiers are fed into the elevator.

Other objects and features of the invention will become apparent by reference to the following specification and to the drawings.

IN THE DRAWINGS

FIG. 3 is a side elevational view on an enlarged scale of a portion of the apparatus of FIG. 1, taken from the line 3—3 of FIG. 1;

FIG. 3A is an enlarged detail cross-sectional view, taken on the line 3A—3A of FIG. 3;

FIG. 3B is a detail cross-sectional view, taken on the line 3B—3B of FIG. 3;

FIG. 5 is an enlarged cross-sectional view taken on the line 5—5 of FIG. 1;

FIG. 6 is a detail cross-sectional view taken on the line 6—6 of FIG. 7;

FIG. 7 is an enlarged detail side elevational view of the extended tip portion of an individual tine;

FIG. 9 is a detail cross-sectional view taken on the line 9—9 of FIG. 8;

FIG. 10 is a partly sectional front end view of the tine mechanism employed in the pallet magazine of FIG. 8;

FIG. 11 is a fragmentary, front end elevational view taken on the line 11—11 of FIG. 9, with the hopper and pallets removed in the interests of clarity.

Figure 1:
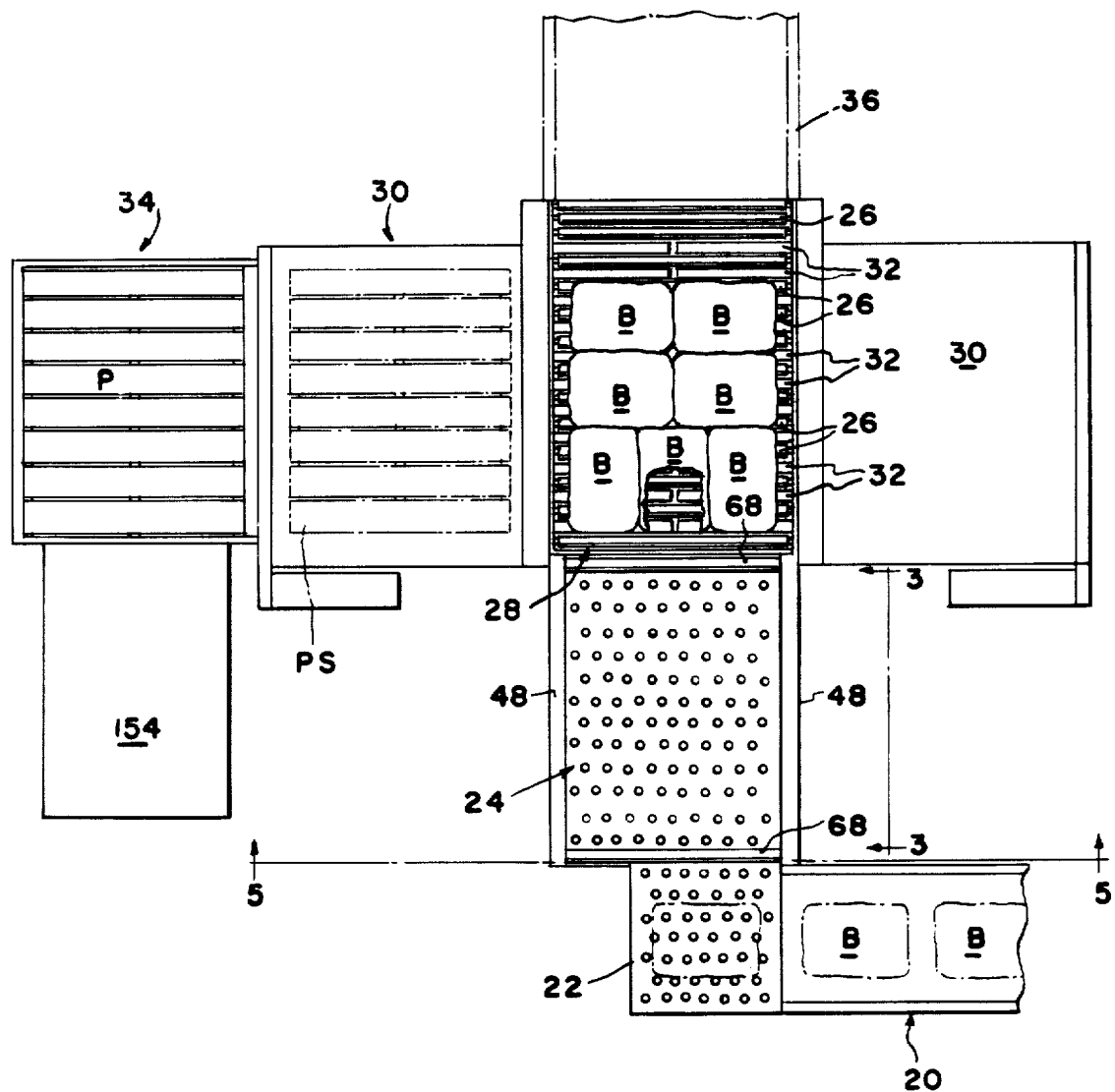
FIG. 1 is a schematic top plan view, with certain parts broken away in the interest of clarity, of a bag palletizer embodying the present invention.
Figure 2:
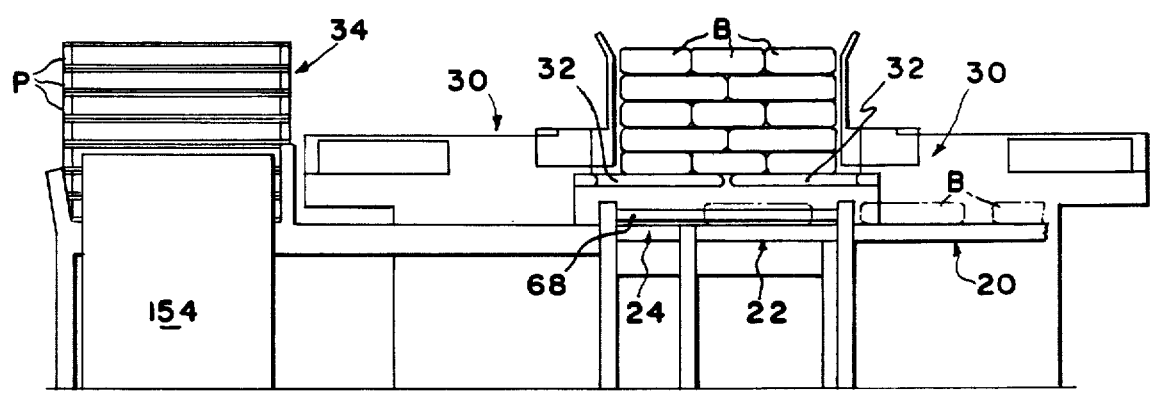
FIG. 2 is a front view of the apparatus of FIG. 1.

The overall organization of a bag palletizing machine embodying the present invention is best seen in FIGS. 1 and 2 of the drawings. Referring first to FIG. 1, paper bags of material B, to be stacked upon a pallet, are fed into the apparatus in line upon an infeed conveyor designated generally 20. The bags B are discharged from infeed conveyor 20 onto an orienting air table 22, upon which the bag is manually oriented and then manually transferred onto an accumulating air table 24. Each of air tables 22 and 24 has its upper surface pierced by a plurality of openings through which upwardly directed air jets from a source of air under pressure A are discharged. A large number of relatively small air jets provides an air cushion beneath the bags B which can support the bags slightly off the surface of tables 22 and 24. This enables the bags to be pushed around upon the tables with substantially no friction, so that the bags may be easily manually moved from one location to another upon the tables.

Upon accumulating table 24, the bags are manually arranged into a compact, generally rectangular group such as that indicated immediately above air table 24 in FIG. 1, which forms a single tier of the multi-tier stack to be assembled. After a tier of articles has been formed upon accumulating air table 24, the assembled tier is transferred from table 24 onto the rollers 26 of an elevator platform assembly designated generally 28. A pair of tine assemblies 30 are mounted on opposed sides of elevator platform 28 and each includes elongate relatively narrow tines 32, see particularly FIG. 2, which may be projected into the path of movement of elevator platform 28 or, alternatively, in a manner to be described in greater detail hereinafter, horizontally withdrawn clear of the path of movement of elevator platform 28.

When viewed from above as in FIG. 1, it will be seen that individual tines 32 are vertically aligned with the spaces between adjacent elevator platform rollers 26 so that the rollers can, during certain steps in the operation of the machine, move vertically past the extended tines 32 without interference.

Referring now particularly to FIG. 2, it will be seen that the apparatus is shown with some five tiers of bags B, supported upon tines 32. During subsequent operation of the apparatus, a newly formed tier of articles may be transferred from table 24 onto the rollers 26 of elevator platform 28, when the platform 28 is in its lowered position in which its rollers 26 form a horizontal extension of the surface of table 24. After this new layer is supported upon the platform, elevator platform 28 is elevated until the bags B supported upon the elevator platform lie just barely below the tines 32. The tines 32 are then retracted from beneath the bags B shown supported thereon in FIG. 2 and the stack of tiers drops onto the newly formed layer of bags B supported upon elevator platform 28. After the tines 32 have been withdrawn, the platform 28, which is now supporting six tiers of bags, is elevated until the lowermost tier of bags in the six-tier stack is supported slightly above the elevation of tines 32. The tines 32 are then returned to the extended position shown in FIG. 2, and upon subsequent lowering of elevator platform 28, support of the six tier stack is transferred to the tines 32.

When the desired number of tiers of articles have been formed upon the stack, the elevator platform 28 is returned to its lower position and a pallet PS (FIG. 1) is advanced from a standby position at the left-hand side of the elevator platform 28 as viewed in FIGS. 1 and 2, onto the platform 28 into underlying alignment with the stack of bags B supported upon the tines 32. The pallet PS, transferred from the standby position shown in FIG. 1, is replaced with another pallet P from a pallet magazine 34.

Elevator platform 28, with the supported pallet PS is then elevated until the pallet is just below tines 32 (FIG. 2), at which time the tines 32 are withdrawn from beneath the stack of bags B to deposit the stack upon the pallet. The elevator platform is then lowered to its lowermost position and rollers 26 of the elevator platform are driven in rotation to convey the loaded pallet from the elevator to a discharge conveyor partially indicated at 36 in FIG. 1.

Apparatus for transferring an assembled tier of bags B from accumulation table 24 onto elevator platform 28 is shown in FIGS. 3, 3A and 3B.

Referring first to the right-hand portion of FIG. 3, that end of elevator platform 28 adjacent accumulation table 24 is partly shown. The platform assembly 28 includes a pair of vertically disposed frame plates 38, having a series of upwardly projecting post portions 40 separated from each other by relative deep vertical notches 42 (see also FIG. 4). The rollers 26 of the elevator platform are mounted upon and extend between the tops of the post portions 40 of plates 38. Interspersed between adjacent elevator platform rollers 26 are support rollers 44 which are mounted for rotation about fixed axes on a fixed member 46 of the machine frame. Plates 38 of the elevator platform are shown in FIG. 3 with the elevator platform in its lowered position, in which the rollers 26 of the elevator platform are at the same elevation as the support rollers 44. This in turn is at the same elevation as the top of table 24.

A pair of vertical plates 48 are fixedly mounted upon the machine frame to extend along two opposed sides of stable 24. A series of sprockets 50, 52, 54, 56 and 58 are mounted for rotation on each of the vertical plates 48 and endless chains 60 are operatively trained about these sets of sprockets. The chains 60 are driven by a drive motor and gear reduction assembly designated generally 62 which is coupled to drive sprocket 58 via a belt and pulley connection designated generally 64 in FIG. 3. At spaced locations along each chain 60, carrier arms 66 (FIG. 3A) are pivotally coupled at one end to the chain and rotatably support at their opposite end a pusher bar 68 (see FIGS. 1, 2, 3, and 3A) which extends laterally across table 24 between the two chains 60. When chains 60 are driven, pusher bar 68 is carried across the top of table 24 toward the elevator to engage and advance the tier of articles supported upon the table onto the support rollers 44 and elevator platform rollers 26.

Referring now particularly to FIGS. 3A and 3B, an angle iron 70 is welded to the inner side of each frame plate 48 to extend along the upper edge of the plate.

A channel-shaped chain shield-guide plate 72, with a guide surface 72a, is supported upon the top of angle iron 70 to function as a side guide, guiding the bags B in movement onto the elevator 28. Shield 72 is adjustably positioned upon angle iron 70 for adjusted movement to the left from the position shown in FIGS. 3A and 3B by bolts 73 which pass through elongate slots 74 in shield 72 in accordance with the dimensions of the articles being handled.

As best seen in FIG. 3B, a chain guide plate 76 is fixedly mounted on the inner side of each plate 48, as by bolts 78 and spacers 80, to slideably support and guide the upper run of a chain 60, the chain supports 76 extending substantially the entire distance between sprockets 50 and 52.

Returning now to FIG. 4, as a tier of bags B is advanced by pusher bar 68 onto the elevator platform, the elevator platform rollers 26 and the interspersed support rollers 44 are driven in rotation to function as a powered roll conveyor advancing the bags across the elevator platform 28. Rollers 26 and 44 are frictionally driven by an underlying drive belt 82 which is held against the bottom of rollers 26 and 44 by a series of freely rotatable pulleys 84 mounted for rotation upon the machine frame. Belt 82 is driven by a motor assembly 86 coupled to drive belt 82 through a belt and pulley arrangement designated generally 88. The speed at which rollers 26 and 44 are driven is selected to be less than the speed at which the articles are driven by pusher bar 68, so that the tier is compacted as it is advanced onto the elevator.

Figure 4:
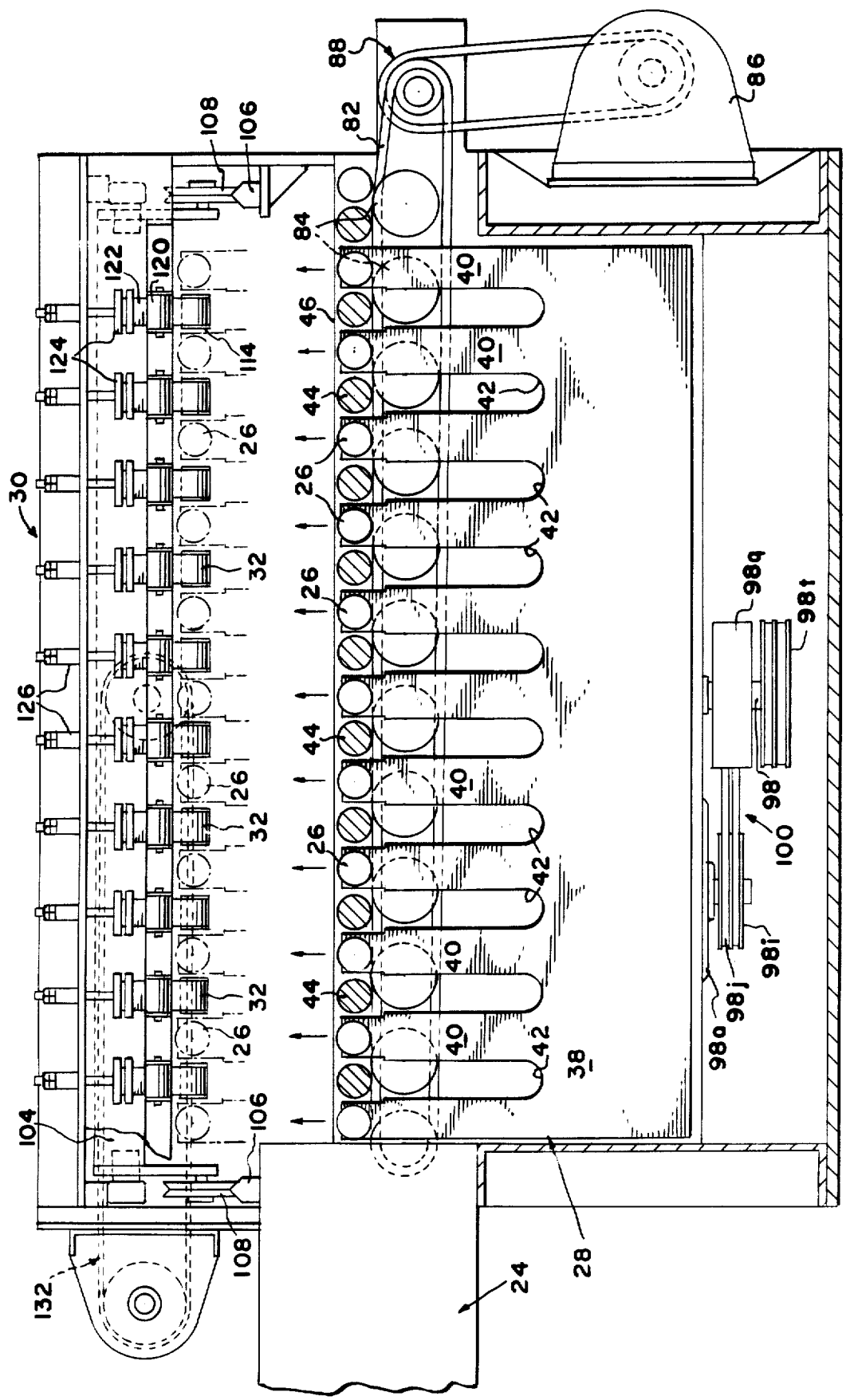
FIG. 4 is a side elevational view, partly in section, of a portion of the elevator and tine assemblies of the machine system illustrated in FIG. 1.
Figure 12:
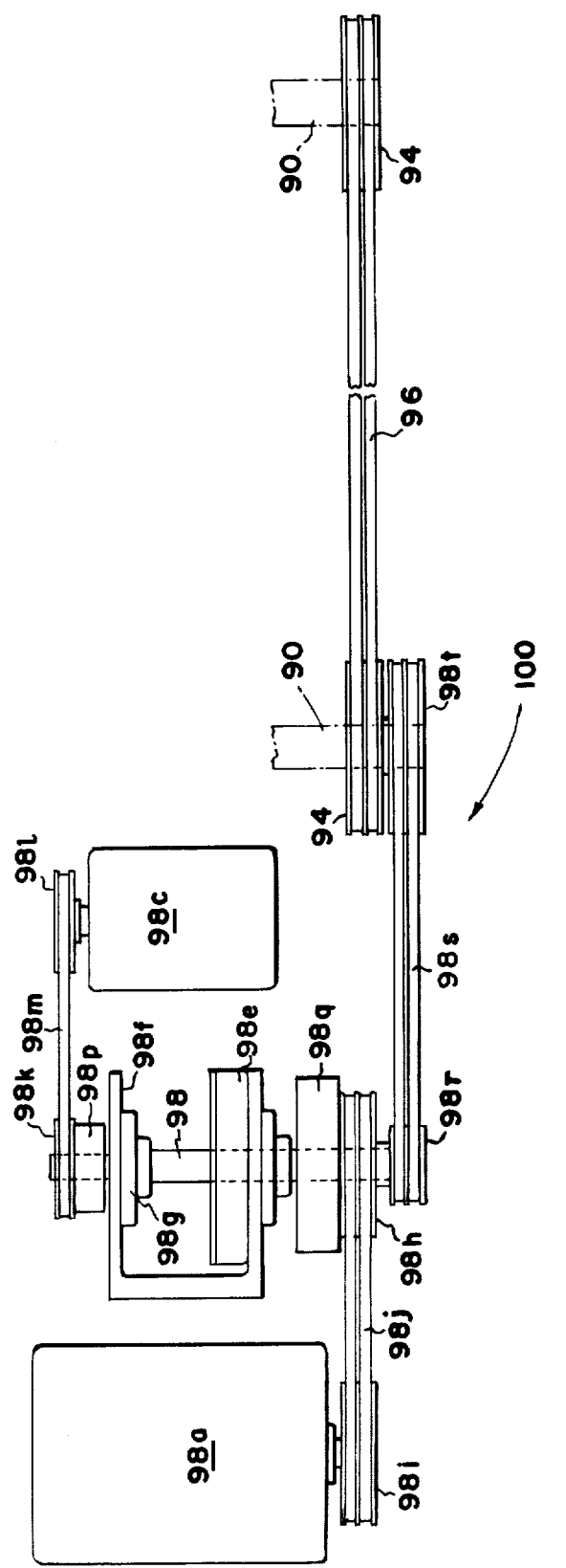
FIG. 12 is a schematic, fragmentary elevational view illustrating the elevator drive system.

Elevator platform 28 is raised and lowered by structure best seen in FIGS. 4 and 5. Referring particularly to FIGS. 5 and 12, a pair of elevator screws 90 are mounted for rotation within the vertical plates 91 of the fixed frame of the machine at opposite sides of table 28. Screws 90 are threadably received in threaded thrust collars or nuts 92 which are fixedly mounted on brackets 92a on each of the frame plates 38 of elevator platform assembly 28. At their lower ends, each of the screws 90 carry a pulley 94, the pulleys 94 at the opposite sides of the platform 28 being coupled to each other by an endless drive belt 96.

A clutch controlled elevator drive motor assembly 100 is diagramatically illustrated in FIG. 12 and includes a jack shaft 98, an "elevator up" motor 98a, and an "elevator down" motor 98c. The jack shaft 98 is journaled in bearing structure 98g, supported on a jack shaft support frame 98f which is mounted on the machine frame. Motor 98a drives a pulley 98h via pulley 98i and belts 98j. Motor 98c drives a pulley 98k via pulley 98l and belt 98m. An electrically controlled, magnetic clutch 98p, driven by pulley 98k, transfers, or does not transfer, the drive of motor 98c to the shaft 98. Similarly, an electrically controlled magnetic clutch 98q transfers, or does not transfer, the drive of pulley 98h to shaft 98. With this assembly, motors 98a and 98c can be constantly driven. Shaft 98 is connected via pulley 98r and belts 98s to a pulley 98t on the one screw 90. A brake 98e which can be electrically or magnetically energized, is provided on the shaft 98. Details of the construction of tine assemblies 30 are seen in FIGS. 4–7.

As best appreciated from FIG. 4, each tine assembly 30 extends laterally along one side of elevator platform 28 and, as mentioned previously, a series of individual tines 32 are located to be in alignment with the spaces between the rollers 26 of elevator platform 28.

Each tine assembly 30 includes a fixed frame designated generally 102 (FIG. 5) fixedly mounted on the main machine frame. A tine carriage 104 is mounted within frame 102 for horizontal movement from right to left and vice versa as viewed in FIG. 5. The carriage, as best seen in FIG. 4, extends across substantially the entire width of the tine assembly and is supported at its opposite sides for movement along V-shaped rails 106 by grooved rollers 108 mounted at the front and rear of each opposite side of carriage 104.

For each of the individual tines 102, a rigid bar 110, with a teflon (or similar friction reducing material) upper surface 110a fixed to it, is fixedly mounted upon carriage 104 to project from the carriage toward the elevator by a distance which is slightly greater than one-half of the width of elevator platform 28. Referring now particularly to FIGS. 6 and 7, at the distal end of each bar 110, a channel-shaped member 112 is fixedly mounted upon the bar and projects forwardly of the distal end of the bar to rotatably support a roller 114 for free rotation.

For each of tine bars 110, a pair of rollers 116 and 118 are mounted for free rotation upon carriage 104 and a direction changing roller 120 is mounted upon the fixed frame 102 immediately above the rollers 114 when the tine assemblies are in the retracted position shown in FIG. 5. A belt 122 is clamped at one end by a spring tensioned clamp 124 to the fixed frame for each individual tine 32. From clamp 124, each belt 122 is trained successively around a roller 120 on the fixed frame, the roller 114 at the distal end of each tine bar 110, and thence beneath the tine bar 110 to pass successively around rollers 116 and 118. The belt is then led forwardly above carriage 104 and its associated tine bar 110 and is fixedly clamped to the fixed frame 102 by a clamp 126.

The carriages 104 of the respective tine assemblies are driven in extending and retracting movement from and to the position shown in full line in FIG. 5 by means of a drive screw 128 mounted for rotation in frame 102 and threaded through a drive collar or nut 130 fixedly mounted upon carriage 104. The screws 128 are driven in rotation by means of reversible, motor driven belt and pulley drives designated generally 132 driven by motors M.

In FIG. 5, the tines 32 are shown in their retracted positions in which the tines are withdrawn clear of the path of vertical movement of elevator platform 28. The tines are movable from the full line positions shown in FIG. 5 to the extended position indicated in broken lines in FIG. 5 in which the distal ends of the tines from opposite sides of the elevator platform are positioned closely adjacent each other so that the tines cooperatively extend substantially entirely across the vertical path of movement of elevator platform 26.

As the tines begin to move from the retracted position shown in full line in FIG. 5 toward their respective fully extended positions shown in chain lines, the rollers 114 at the distal ends of the individual tines advance as the tine carriage is moved inwardly from the position shown in FIG. 5. This advancing movement of the roller 114 extends the belt 122 from the fixedly located roller 12, and, as the tine bar 110 begins to project into the path of movement of the elevator, the belt is drawn upwardly from beneath the tine, around roller 114 and is laid down on top of that portion of bar 110 which projects beyond the stationary roller 120. Although, as indicated, the belt remains tight or tensioned at all times, the necessary length of belt to be laid upon the advancing bar 110 comes from that run of the belt between the clamp 126 and roller 118 which is advancing at the same rate as roller 114. Thus, when the tines are fully extended, the top surface of each individual tine is constituted by the belt rather than the upper surface of the individual bars 110. When a tier of bags is supported upon the extended tines, the surface of the bags engages the top of the belts 122 which are in turn supported upon their respective underlying tine bars 110.

When the tines are retracted to withdraw support from beneath the tier of articles B at one stage of the stacking operation, the retracting carriage 104 causes rollers 116 and 118 to reel in the belt as the roller 114 moves in the retracting direction. However, that portion of the belt which extends from the stationary roller 120 across the top of the retracting bar 110 to roller 114, remains stationary with respect to the articles supported upon it, the top surface of the bar 110 sliding beneath the belt. Actually, the belt is drawn around roller 114 at the same rate of speed, but in the opposite direction to that of movement of the bar. Thus, there is no relative movement between the belt and the article supported upon the belt other than a peeling away of the belt around roller 114 as the tine is retracted. This is an important consideration where the article may take the form of relatively heavy loose cement contained in paper bags, for example, where the bottom layer is pressed with considerable force against the top of the tine and relative motion between the tine and bottom bag during withdrawal of the tine would tend to rip the paper material of the bag.

A pair of stripping-squaring assemblies 134 are mounted upon opposite sides of the elevator platform, conveniently upon the top of each of the tine assembly frames 102. Each squaring assembly includes a flat plate assemblies. Each plate 136 is driven in back and forth movement to compress each tier of bags added by a fluid pressure actuated piston-cylinder assembly designated generally 140. The plates 136 extend laterally the entire 136 mounted upon a fixed frame 138 for horizontal movement parallel to the direction of of the tine width of a tier of articles B and function to align and compress the adjacent sides of the stack of articles as well as assist in stripping the articles from the retracting tines. The plates 136 may exert as much as six thousand pounds of pressure to compress and flatten the adjacent sides of the bags which normally have a convex shape. In compacting the bags, their normal length is decreased by the amount necessary to flatten their ends. The plates 136 move in to a stop position governing the final size of the stack, but do not grip the stack with such force as to prevent the bags from sliding downwardly under the influence of gravity to the tier below when the tines are retracted. This flattening tends to cause the upper surfaces of the bags to assume a concave configuration which combats their tendency to slide out of alignment. The plates 136 move to compress the stack when the tines 32 are moved inwardly and move outwardly just after the tines 32 are retracted. Further, just prior to discharge of the palletized stack, the plates 136 move inwardly at a time when the tines 32 remain in withdrawn position to give the stack a final recompression before they are withdrawn and the palletized stack is discharged.

Details of the pallet supply apparatus are best shown in FIGS. 8–11.

The pallet supply apparatus is made up of three major components, namely, a pallet hopper designated generally 150 in which a stack of empty pallets P are maintained, a pallet transfer carriage designated generally 152 having one end underlying the stack of pallets in hopper 150, and a pallet manipulator 154 to be presently described, located at one side of the hopper 150.

Figure 8:
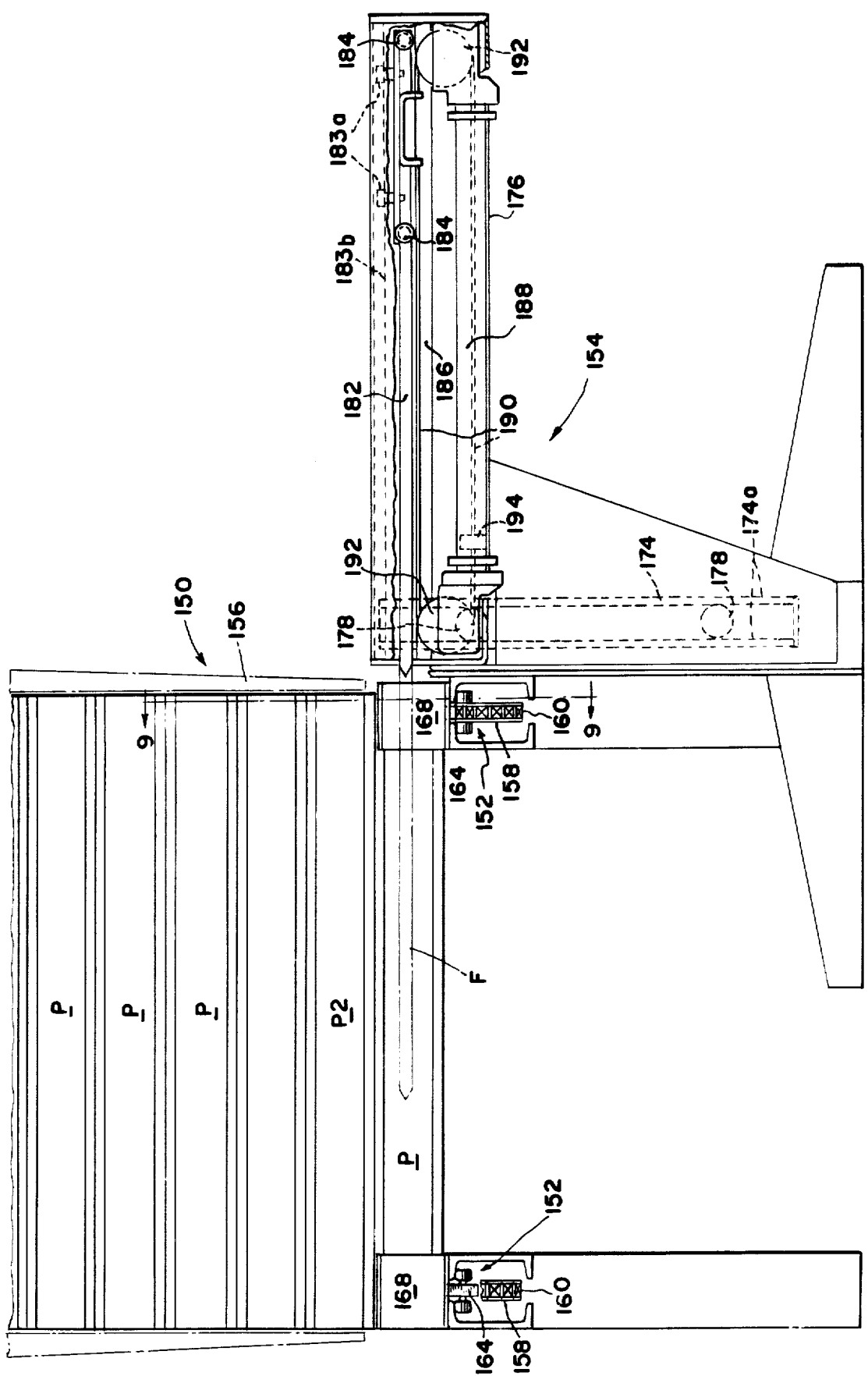
FIG. 8 is a fragmentary side elevational view showing a pallet supply apparatus employed in the machine of FIG. 1.

Hopper 150 consists simply of a set of upright panels 156 mounted upon the machine frame to define a shaft which will confine the stack of empty pallets P and maintain the stack in alignment with one end of the pallet transfer carriage 152. Transfer carriage 152, as best seen in FIGS. 8 and 9, includes a pair of endless chains 158, each chain 158 being trained around a pair of end sprockets 160 and 162, rotatably mounted on the machine frame so that the chains 158 extend in horizontal upper and lower runs between the sprockets 160 and 162. A pallet carriage 164 is coupled into each chain and includes an elongate platform 166, elongated longitudinally of the chain, and a rearwardly and upwardly inclined guide retainer 168 at the rearward or left-hand end of the carriage 152 as viewed in FIG. 9. The carriages 164 on the two chains are laterally aligned with each other and the chains are driven simultaneously by a reversible carriage drive motor assembly 170 (FIG. 11) which rotatably drives a shaft 172 extending between the two sprockets 160 at the rearward end of the chains 158.

As best seen in FIG. 1, the pallet hopper 150 and pallet manipulator 154 are located spaced from the left-hand side of elevator 28, and, as best seen in FIG. 9, the transfer carriage 152 extends from a position underlying the stack of pallets P in hopper 150 beneath the left-hand tine assembly 30 to a position adjacent the left-hand side of elevator 28.

The pallet carriages 164 are movable by the chains 158 from a normal position in which the carriages underlie and support the stack of pallets P in the hopper to a transfer position shown in broken line in FIG. 9 in which the carriage is positioned to support a single pallet in a standby or ready position closely adjacent one side of the elevator 28, but clear of the path of vertical movement of the elevator platform 28.

Referring now particularly to FIGS. 8 and 10, pallet manipulator 154 includes a fixed frame having a pair of vertical frame members 174a defining a vertical track 174. A vertically movable carriage designated generally 176 is guided for vertical travel in tracks 174, as by rollers 178, and is raised and lowered relative to the fixed frame as by a fluid pressure actuated cylinder 180 (FIG. 10). A pair of elongate forks 182 are coupled to each other as by a cross frame member 183 and supported by rollers 184 for horizontal movement along tracks 186 mounted upon the elevating carriage 176 of the manipulator 154. Frame member 183 carries rollers 183a guiding on a fixed frame bar 183b. The forks 182 are driven in movement by an elongate pressure actuated cable cylinder 188 from which a cable 190 trained about a pair of end sprockets 192 extends. The cable is connected to a piston 194 at opposite sides of the piston and is also connected to opposite ends of the fork carrying cross frame member 183. The application of air under pressure to piston 194 moves the piston in one or the other direction depending upon which side of the cylinder is pressurized, and the motion of piston 194 is transmitted by cable 190 to the carriage to drive the forks 182 in movement.

In FIG. 8, carriage 176 is shown in its lowered position with the forks 182 fully retracted. The fork may be horizontally extended relative to carriage 176 by actuation of the cable cylinder 188 to position the forks in the position shown in broken line at F in FIG. 8 in which the forks may be projected into the pallet stack. Carriage 176 may be elevated from the position shown to a position in which the forks may be extended or telescoped into the next to lowermost pallet P2 in the stack and then elevated to lift the pallet P2 clear of the lowermost pallet which rests upon carriages 164. When the pallet stack is so elevated, the lowermost pallet may be transferred by carriages 164 out of the pallet hopper to the position shown at PS-1, and then upon retraction of member 152 moves back into the standby position occupied by the pallet PS in FIG. 9. While the pallets in the hopper are held elevated by the forks as described above, the carriages 164 are returned from the broken line position of FIG. 9 back to the full line position in FIG. 9 in which the carriages underlie the elevated stack. During this retracting movement of the carriage, a pivoted dog 196 (FIG. 9) strips the pallet PS from the retracting carriage 152. After the carriages 164 have been returned to their original or full line position as viewed in FIG. 9, the manipulator carriage 176 is lowered until the pallet P-2 supported upon the forks rests upon the carriages 164. The carriage 176 is then lowered a slight additional distance to clear the forks and the forks 182 are retracted back to the full line position shown in FIG. 8.

With movement of the next subsequent pallet from the hopper to the standby position in the manner described previously, the leading edge of the platform 166 engages the pallet located in the pallet standby position and pushes that last pallet from the standby position onto elevator assembly 28.

THE OPERATION

The sequence of operation of the apparatus described above will be set forth below in terms of operation of specific elements of the machine. Preferably operation of the various drive motors is under the control of a programmable controller PC which is programmed to actuate or operate the various motors in the desired sequence. Such programmable controllers are commercially available from a wide variety of sources and since the details of such devices are well-known to those skilled in the art and do not, per se, form a part of the present invention, a detailed description of the controller is not herein set forth.

As an initial condition, the various elements of the apparatus are positioned as follows. Elevator 28 is in the fully lowered position shown in FIG. 4, with the rollers 26 of the elevator platform interposed between the rollers 44 mounted upon the fixed frame and drive motor 86 is energized to drive drive belt 82 in a direction in which the rollers 26 and 44, as viewed in FIG. 4 are driven in a clockwise direction.

Tines 32 are in the retracted position shown in full line in FIG. 5 and stripper and stack squaring plates 136 are retracted. The pallet carriages 164 are in the full line position of FIG. 9, supporting a stack of pallets P in the pallet hopper and a pallet PS is located in the standby position between the pallet hopper 150 and elevator 28. The pallet manipulator forks 182 are retracted as shown in FIG. 8 and the manipulator carriage 176 is at the lowered position shown in FIG. 8.

Bags B to be stacked are then fed in line on infeed conveyor 20 (FIG. 1) onto air table 22, where the bags individually are manually oriented and manually shifted onto the accumulating air table 24. When a tier of bags has been assembled in the desired pattern on table 24, motor 62 is actuated to drive pusher bar 68 across the surface of table 24 toward the lowered elevator 28. The rate at which the tier of bags is advanced by pusher bar 68 is somewhat faster than the rate at which the bags would be conveyed by rollers 26 and 44 which, as described above, are being driven in rotation at this time. This speed differential causes the desired compaction of the individual articles in the tier.

When the tier of articles has been located upon the elevator platform, the platform is elevated by actuation of clutch 98f which drives the elevating screws 90 to elevate rollers 26 with the tier of bags supported upon the rollers 26. The initial layer of the stack is elevated until the rollers 26 of the elevator platform are above the path of movement of tines 32 (FIG. 5).

Tines 32 are then extended into the broken line positions shown in FIG. 5 by the motors M driving screws 128, the upper surfaces of the individual tines being overlayed, as described above, by the belts 122. When the tines are located in their extended position and plates 136 have been actuated to compress the bag ends, elevator 28 is lowered, the rollers 26 passing freely through the spaces between the extended tines to transfer support of the tier of articles from rollers 26 to the extended tines 32. Plates 136 are then withdrawn and elevator 28 is returned to its fully lowered position shown in FIG. 4 by clutch 98p and motor 98c.

The next subsequent tier of articles is assembled and transferred to elevator 28 in the manner described above. When the second tier of articles has been located upon the elevator, elevator 28 is raised until the tier of articles supported upon the elevator is just beneath the bottoms of the extended tines 32. The elevator is halted in this position and the tines are retracted to the full line position shown in FIG. 5, causing the first tier of articles to be stripped from the tines and deposited on top of the layer of articles supported upon the elevator.

As described above, the belts 122 which are interposed between the tops of the tines and the articles do not slide relative to the supported articles B during this retracting movement of the tines.

The squaring plates 136 assist in stripping the tier of articles from the retracting tines. After the tines have been fully retracted, elevator 28 is again elevated until its rollers 26 are located above the path of movement of tines 32. The tines are then extended and, when they are fully extended, the elevator is again lowered, transferring supporting of the two tiered stack from the elevator to the extended tines. The squaring plates 136 square up the sides of the stack with the addition of each tier and then are retracted.

Subsequent tiers of articles are assembled upon table 24, transferred to the elevator, and assembled into the stack by the same process as described in connection with the second tier of articles.

When the desired number of tiers of articles have been assembled into the stack, and are supported upon the tines, pallet manipulator 154 and the pallet transfer carriage 152 are operated as described above to transfer a pallet from pallet hopper 150 to the pallet standby position, in so doing pushing the pallet originally located at the standby position from that position onto the surface of the lowered elevator 28.

The elevator 28 is then elevated until the pallet supported upon the elevator is just below the extended tines. The tines are then retracted to transfer support of the stack of articles from the tines onto the pallet, the squaring plates 36 are actuated to finally square up the stack and then retracted, and the elevator is then restored to its fully lowered position.

Upon arrival of the elevator at the fully lowered position, the platform rollers 26 and stationary rollers 44 are driven by motor 86 to act as a powered roll conveyor to convey the pallet with the stack of articles supported thereon clear of the elevator and onto the discharge conveyor 36.

While one embodiment of the invention has been described in detail, it will be apparent to those skilled in the art that the disclosed embodiment may be modified.

Therefore, the foregoing description is to be considered exemplary rather than limiting, and the true scope of the invention is that defined in the following claims.

What is claimed is:

1. A method of assembling a multi-tier stack of compressible articles such as bags of particulate material or the like having normally vertical convex perimetral side surfaces on a pallet or carrier with an elevator having an article support surface defined by a plurality of generally horizontal spaced parallel elements, movable vertically in an elevator shaft; tines, with article support surfaces thereon, projectable generally horizontally between said elements, from retracted positions out of the elevator shaft, for receiving and supporting tiers of articles transferred thereto by the elevator; and a vertically extending compression plate mechanism just above said tines movable parallel thereto from a retracted position to compress opposite sides of bags in the elevator shaft; including the steps of:

a. receiving a tier on the elevator and raising the elevator to a level to position the tier above the projection path of the tines at a time when the tines are retracted;

b. projecting the tines from a retracted position to a position below the tier and moving the compression plate mechanism from retracted position to physically compress the opposite sides of bags in the tier and displace material in the sides of the bags to flatten the convex vertical side surfaces and concave the upper surfaces of the bags without exerting a compressing force which prevents the bags from dropping under the influences of gravity;

c. lowering the elevator through the tines to transfer the tier to the tines and the elevator to a position sufficiently below the tines to receive the next tier thereon;

d. receiving the next tier on the elevator and raising the elevator to position said next tier just below the tines;

e. retracting the tines out of the shaft, while maintaining the compression plate mechanism in place, to deposit the tier formerly supported on the tines by gravity vertically on the upper surface of said next tier, and then retracting the compression plate mechanism;

f. raising the elevator to position the tiers thereon above the projection path of the tines;

g. reprojecting the tines and compression plate mechanism into the elevator shaft; and h. lowering the elevator through the tines to transfer the tiers to the tines and the elevator to a position below the tines.

2. The method of claim 1 wherein, after a predetermined number of tiers of articles are stacked, a pallet is placed on the elevator means beneath the stack of articles and the compression plate mechanism is reprojected into the elevator shaft independently of the tines to compress the stack, and then withdrawn, prior to removal of the pallet and the stack thereon.

* * * * *

UNITED STATES PATENT AND TRADEMARK OFFICE
CERTIFICATE OF CORRECTION

PATENT NO. : 4,712,975
DATED : December 15, 1987
INVENTOR(S) : Thomas R. Salts

It is certified that error appears in the above-identified patent and that said Letters Patent is hereby corrected as shown below:

Column 4, line 37, change "stable" to -- table -- .

Column 6, line 50, change "roller 12" to -- roller 120 -- .

Column 7, line 24, before "assemblies" insert -- 136 mounted upon a fixed frame 138 for horizontal movement parallel to the direction of movement of the tine -- , bridging lines 28 and 29, after "entire" delete -- 136 mounted upon a fixed frame 138 for horizontal movement parallel to the direction of the tine -- .

Signed and Sealed this

Seventh Day of June, 1988

*Attest:*

DONALD J. QUIGG

*Attesting Officer*  *Commissioner of Patents and Trademarks*